July 8, 1941.　　　　L. KAMENAROVIC　　　　2,248,428
COUPLING
Filed June 1, 1937
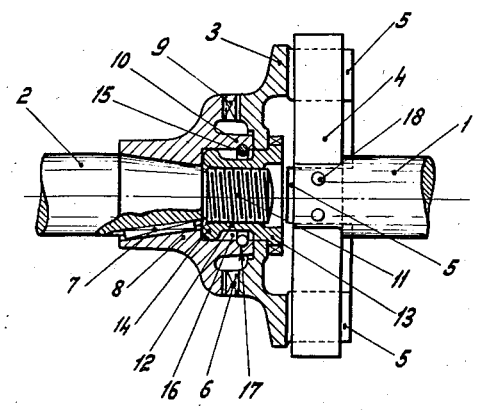
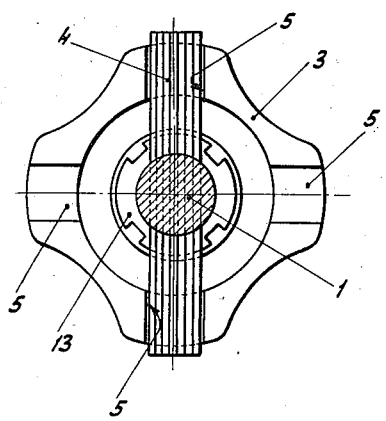
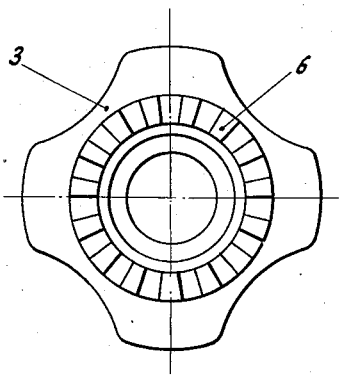
Inventor:
L. Kamenarovic,
By E. F. Windroth
Atty Patented July 8, 1941

2,248,428

UNITED STATES PATENT OFFICE 2,248,428

COUPLING

Leone Kamenarović, Milan, Italy, assignor to Fabrica Italiana Magneti Marelli Società Anonima, Milan, Italy, a corporation of Italy Application June 1, 1937, Serial No. 145,895
In Italy June 1, 1936

3 Claims. (Cl. 64—15)

This invention relates to couplings for shafts and more particularly to couplings for imparting the drive to ignition magnetos, in which the resilient engagement of the driving shaft and driven shaft is secured by means of an intermediate member which provides for adjusting the respective angular position of said two shafts.

The presently known couplings of the above described kind include two plates fast respectively on the driving shaft and on the driven shaft and having different number of radial teeth on their opposite faces, and an intermediate member of rubber or equivalent material having teeth on its faces which are adapted to engage the said teeth of the shaft plates.

In order to remove the troubles inherent to a rubber member whose strength usually is not sufficient for the purposes the couplings of this kind are devoted to, it has been suggested to insert a number of metal members intermediate the two plates solid with the driving and driven shaft, said members providing for an elastic interconnection of said plates and for the adjustment of their respective angular position.

The above stated construction makes the coupling materially more complicated and the difficulties in handling when the coupling is dismantled are made more heavy, the coupling parts being then subject to become released, to fall down and to become lost.

The present invention has for its object an elastic coupling with a provision for adjusting the angular respective setting of the intercoupled parts, said coupling being made entirely of metal and having a simple construction and handling, while all the parts providing it remain connected with the respective shafts after the coupling is dismantled.

An embodiment of the coupling of this invention is illustrated on the annexed drawing by way of example and Figure 1 is a central section of said coupling;
Figure 2 is an end view as seen from right hand in Fig. 1, and
Figure 3 is a separate front view of the intermediate member of the coupling as seen from left hand in Fig. 1.

In the drawing, 1 denotes the driving shaft, 2 denotes the driven shaft and 3 denotes an intermediate member intercoupling said two shafts, this intermediate member being ring-shaped in the illustrated construction.

A stack of superimposed resilient metal sheets or strips 4 is fast transversely on the driving shaft 1 by means of rivets 18, said stack providing an elastic member; for engaging said stack with the intermediate member 3, this member 3 has two or more pairs of diametrically opposite and aligned radial recesses 5.

On its opposite face the said member 3 has a circular row of radially extending teeth 6 intended for its engagement with a part fast on shaft 2.

For the scopes of said engagement, on the tapering end of shaft 2 a sleeve 8 is fast by means of a cotter 7, said sleeve having a circular row of radial teeth 9 adapted to engage the teeth 6 of the intermediate member 3, and a tubular extension 10 in its central portion.

The shaft 2 extends within said extension 10 and has a screw-thread portion 11 on which a collar 12 is screwed; the collar 12 has a projecting rim 13 at its outer end, said rim being provided with engaging means, while said collar 12 has an end flange 14 inside said member 8, a groove 16 being left intermediate said rim 13 and flange 14.

An annular groove 17 is provided inside the sleeve 10 and a split annulus 15 is fast therein said annulus 15 extending in the said groove 16 for engagement with flange 14.

In the conditions illustrated in Fig. 1 the coupling is in operative conditions and the collar 12 fast on portion 11 of shaft 2, engages by its rim 13 with the internal edge of the member 3 and holds it with its teeth 6 in engagement with teeth 9 of the sleeve 8 which in turn is fast on the tapering portion of the shaft 2. Should it be required to dismantle the coupling for the purpose of modifying the respective angular position of the shafts 1 and 2, the collar 12 is unscrewed from the portion 11 of shaft 2 by an action on rim 13 thereof, said shaft 2 having been removed with parts cooperating therewith from shaft 1 and respective cooperating part 4, until the flange 14 of collar 12 has been carried in engagement with the annulus 15.

Due to the described manipulation the intermediate member 3 is made free to move longitudinally and then the teeth 6 thereof are released from those 9 of the sleeve 8 but said member 3 is still connected with the shaft 2 because the annulus 15 provides an abutment for the flange 14 of collar 12 which is thus prevented from becoming detached from sleeve 8.

After said member 3 has been carried in the desired angular position with respect to sleeve 8 it may be again engaged in such position with said sleeve 8 by screwing again the collar 12 home on the portion 11 of the shaft 2.

To provide for a large number of different possible respective angular positions of the parts, it is sufficient that the pairs of aligned slots 5 provided on a face of part 3 are at angle to each other which includes the angle of one tooth 6 a fractionary number of times.

The coupling of this invention provides for easily adjusting the respective angular setting of the shafts 1 and 2, consists entirely of metal parts and its sections pertaining to respective shafts do not include parts able to be permanently detached from each other.

What I claim as my invention and desire to secure by United States Letters Patent is:

1. A coupling comprising a driven member fixed to a driven shaft, said member having an annular flange and an annular series of teeth, a driving member having an annular series of cooperating teeth, means locking said driving member to said driven member with said teeth in engagement and means limiting longitudinal displacement between said driven and driving members for adjustment of said teeth.

2. A coupling comprising a driven member fixed to a driven shaft, said member having an annular flange and an annular series of teeth, a driving member having an annular series of cooperating teeth, said driven shaft having a screw threaded portion, a screw threaded collar releasably screwed on said screw threaded portion of said driven shaft, means for restricting the longitudinal displacement of said collar along said driven shaft and said collar cooperating with said driving member and said driven member to bring said teeth into engagement and provide for a restricted longitudinal displacement of said driving member with respect to said driven member for adjustment of said teeth.

3. A coupling comprising a driven member fixed to a driven shaft, said member having an annular flange and an annular series of teeth, a driving member having an annular series of cooperating teeth, said driven member having an extension encircling said driven shaft and providing a space around a portion of said shaft, said shaft portion being screw threaded, a screw threaded collar releasably screwed on said screw threaded portion of said driven shaft having a groove in register with said space, a spring annulus carried by said driven member and extending in said space and in said collar groove to restrict the displacement of said collar along said driven shaft, said collar cooperating with said driving member to bring said teeth into engagement and provide for a restricted longitudinal displacement of said driving member with respect to said driven member for adjustment of said teeth.

LEONE KAMENAROVIĆ.